US 6,609,605 B1

(12) United States Patent
Linder

(10) Patent No.: US 6,609,605 B1
(45) Date of Patent: Aug. 26, 2003

(54) ARRANGEMENT FOR INTERMEDIATE STORAGE OF PACKAGES

(75) Inventor: Heinz Linder, Hergiswil (CH)

(73) Assignee: Grapha-Holding AG, Hergiswil (CH)

( * ) Notice: Subject to any disclaimer, the term of this patent is extended or adjusted under 35 U.S.C. 154(b) by 0 days.

(21) Appl. No.: 09/591,098

(22) Filed: Jun. 8, 2000

(30) Foreign Application Priority Data

Jun. 21, 1999  (EP) .............................................. 99810548

(51) Int. Cl.[7] .............................. B65G 1/00; B65G 37/00
(52) U.S. Cl. ................................. 198/347.1; 198/347.3; 198/347.4
(58) Field of Search ........................... 198/347.1, 347.3, 198/347.4

(56) References Cited

U.S. PATENT DOCUMENTS

| | | | |
|---|---|---|---|
| 5,301,790 A | | 4/1994 | Prydtz et al. |
| 5,350,050 A | * | 9/1994 | Franke ................. 198/347.1 X |
| 5,529,165 A | * | 6/1996 | Shupert .................... 198/347.3 |
| 5,630,309 A | * | 5/1997 | Blidung et al. ...... 198/347.4 X |
| 5,845,785 A | * | 12/1998 | Oppliger et al. ..... 198/347.1 X |
| 5,960,927 A | * | 10/1999 | Bahr .................... 198/347.1 X |
| 6,170,634 B1 | * | 1/2001 | Jaquet ................. 198/347.1 X |

FOREIGN PATENT DOCUMENTS

| | | |
|---|---|---|
| DE | 3040966 | 8/1982 |
| EP | 0486360 | 5/1992 |
| GB | 1384593 | 2/1975 |

* cited by examiner

Primary Examiner—Christopher P. Ellis
Assistant Examiner—Gene O. Crawford
(74) Attorney, Agent, or Firm—Friedrich Kueffner

(57) ABSTRACT

In an arrangement and a method for intermediate storage of packages, a first transport path is provided to transport packages from a loading station to a transfer station. A second transport path and at least one storage surface arranged along the second transport path are provided, wherein the second transport path receives packages from the first transport path and places the packages onto the at least one storage surface for intermediate storage of the packages and unloads the packages from the at least one storage surface for transport of the packages to the transfer station, as needed.

13 Claims, 3 Drawing Sheets

ARRANGEMENT FOR INTERMEDIATE STORAGE OF PACKAGES

BACKGROUND OF THE INVENTION

1. Field of the Invention

The invention relates to an arrangement for intermediate storage of packages, comprising a transport path for transporting packages from a loading station to a transfer station. The invention relates also to a method for intermediate storage of packages, wherein packages are transported from a loading station to a transfer station by means of a transport path.

2. Description of the Related Art

In shipping arrangements for newspapers there is often the need to intermediately store newspapers collected in the form of packages. This is, for example, especially required when disturbances in the newspaper production occur or the vehicles to be loaded are not available. Such an intermediate storage, however, may also be planned.

In the past, packages which were to be stored intermediately, were stacked by hand and placed onto pallets. The packages were then manually removed from these pallets and placed onto conveying belts or directly loaded into the vehicles. Since efficient devices produce many packages in a very short period of time, this loading and unloading of pallets can be very personnel-intensive.

SUMMARY OF THE INVENTION

It is an object of the present invention to provide an arrangement of the aforementioned kind which allows a simple and inexpensive intermediate storage.

In accordance with the present invention, this is achieved in that for intermediate storage at least one further transport path is provided by which at least one storage surface can be loaded with packages and from which the packages can be unloaded in the transport direction, respectively.

The arrangement according to the invention for intermediate storage is thus provided with at least one further transport path and this transport path has at least one storage surface which can be loaded in the transport direction with packages and from which packages can be unloaded in the transport direction by means of a conveying device. Accordingly, for intermediate storage the packages are transferred onto a further transport path. This transport path has a storage surface as well as a conveying device with which the storage surface can be loaded and unloaded in the transport direction. The loading and unloading of the storage surface can be carried out automatically and also program-controlled by means of the conveying device.

Expediently, several storage surfaces are provided which are serviced by one or more conveying devices. An especially large number of packages can be stored intermediately when several storage surfaces are provided which can be moved away by the conveying device. Accordingly, once a storage surface has been loaded with packages, it is moved by the conveying device and a further storage surface is then loaded by the conveying device. The storage surface is preferably configured such that the packages are positioned without gaps in a row adjacent to one another on the storage surface. This allows storage of the packages intermediately according to routing requirements or efficient loading requirements. A storage surface, for example, then receives all those packages which are designated for sales locations within a certain area. A further storage surface then receives packages designated for another area. When loading the vehicles, this order remains intact.

According to a preferred embodiment, several storage surfaces are combined to a storage unit, for example, a box. This storage unit can then be moved away after loading by means of the conveying device. Conceivable is also an embodiment in which the storage unit is stationary and the conveying device is movable.

The further (second) transport path is preferably linear and has an entry location which is near the loading station. An exit of this second transport path is arranged in the vicinity of the transfer station (vehicle loading station). The conveying device or the storage surface can then be moved in a direction transverse to the transport direction. This makes it possible to arrange several parallel storage surfaces in a space-saving manner. The storage units with these storage surfaces can, for example, be moveably supported on rails.

In accordance with the present invention, the method achieves the above-mentioned goal in that the packages for intermediate storage are transported to a further transport path and these packages are transported away by this further transport path for loading onto vehicles.

According to the method of the invention, the packages, for intermediate storage, are transported in a row to a further transport path having at least one storage surface and these packages, for loading onto vehicles, are transported away by this further transport path. An especially large storage space is available when according to a further embodiment of the method the packages are arranged in a dense formation for intermediate storage. This densification is carried out preferably by sequentially performed transport and waiting periods or steps. The intermediately stored packages are then arranged substantially gap-free in a row. Preferably, several such rows are arranged parallel and adjacent to one another.

DESCRIPTION OF THE PREFERRED EMBODIMENTS

Figure 1:
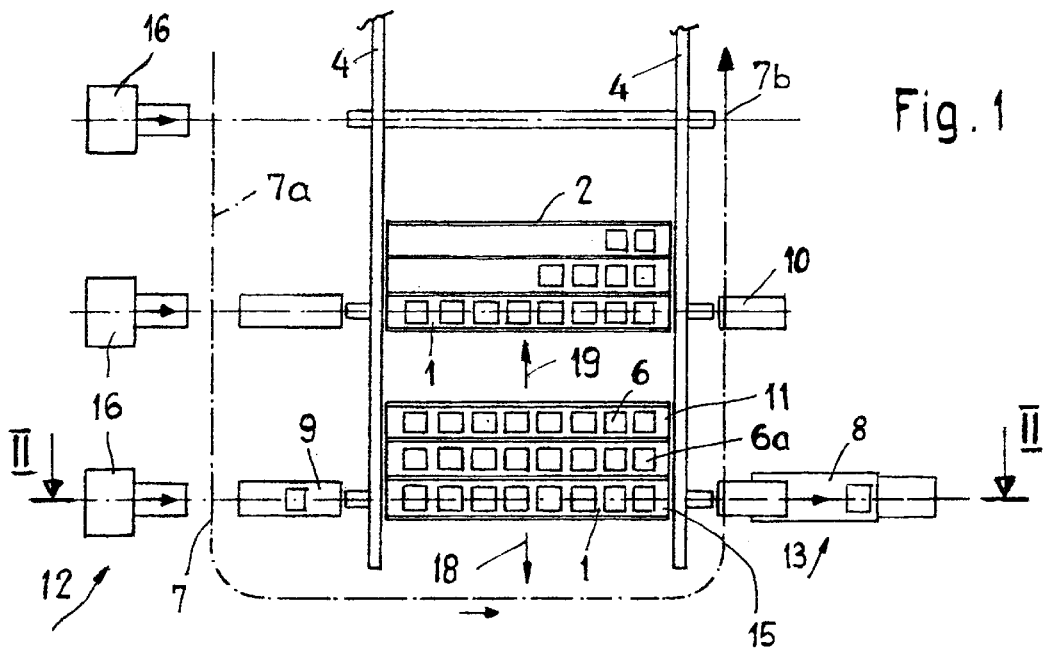
FIG. 1 is a schematic plan view onto an arrangement according to the invention.
Figure 2:
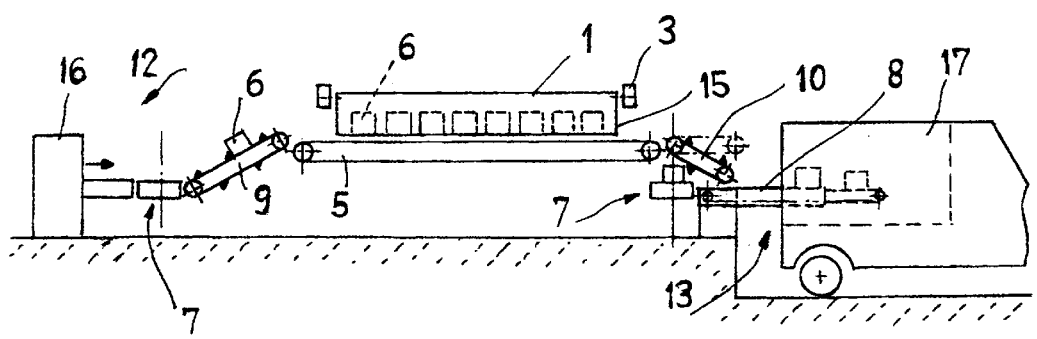
FIG. 2 is a schematic sectional view along the line, II—II of FIG. 1.

The arrangement according to FIGS. 1 and 2 comprises a first transport path in the form of a transport belt 7 with which packages 6 are directly transported from the loading station 12 to the vehicle loading or transfer station 13. In the area 7a the packages 6 are received from the loading station 12 and in the area 7b, substantially parallel to area 7a, the packages 6 are transferred to the transfer station 13.

The loading station 12, for example, has several adjacently arranged stackers 16 in which printed products such as newspapers, supplied, for example, by a rotary printing press, a gravure printing machine or a rotary offset machine, are stacked to form packages 6. The stackers 16 are, for example, cross stackers known in the art and the packages are, for example, wrapped in foil.

The transfer station 13 has at least one loading belt 8 that transports the packages 6 from the transport belt 7 to a vehicle 17. When no vehicle 17 is available, the packages 6, of course, cannot be loaded. In order to be able to continue printing of the newspapers and stacking them in the form of packages 6, the packages 6 are intermediately stored in a way to be explained in the following.

Between the loading station 12 and the transfer station 13 at least one conveying device 5, for example, a conveyor belt, is arranged that forms a second transport path. As is illustrated in FIG. 2, the conveying device 5 is positioned slightly above the plane of the transport belt 7. Packages 6 can be transported by means of the conveying device 5 from the left to the right (FIGS. 1 and 2) and can thus be transported from the loading station 12 to the transfer station 13. The transport of the packages 6 from the loading station 12 to the conveying device 5, according to FIG. 2, is carried out by means of an upwardly inclined conveyor belt 9 or any other suitable conveying device. The transport of the packages 6 from the conveying device 5 to the transfer belt 8 is realized by means of a pivotable belt 10 or any other suitable conveying device. In the horizontal position illustrated by dashed lines in FIG. 2, the transfer belt 8 stands still. In this situation, the transport of packages is performed directly by the transport belt 7. In order to transport packages 6 from the conveying device 5 onto the transfer belt 8, the belt 10 is positioned at a downward slant, as illustrated in FIG. 2 in solid lines.

Figure 3:
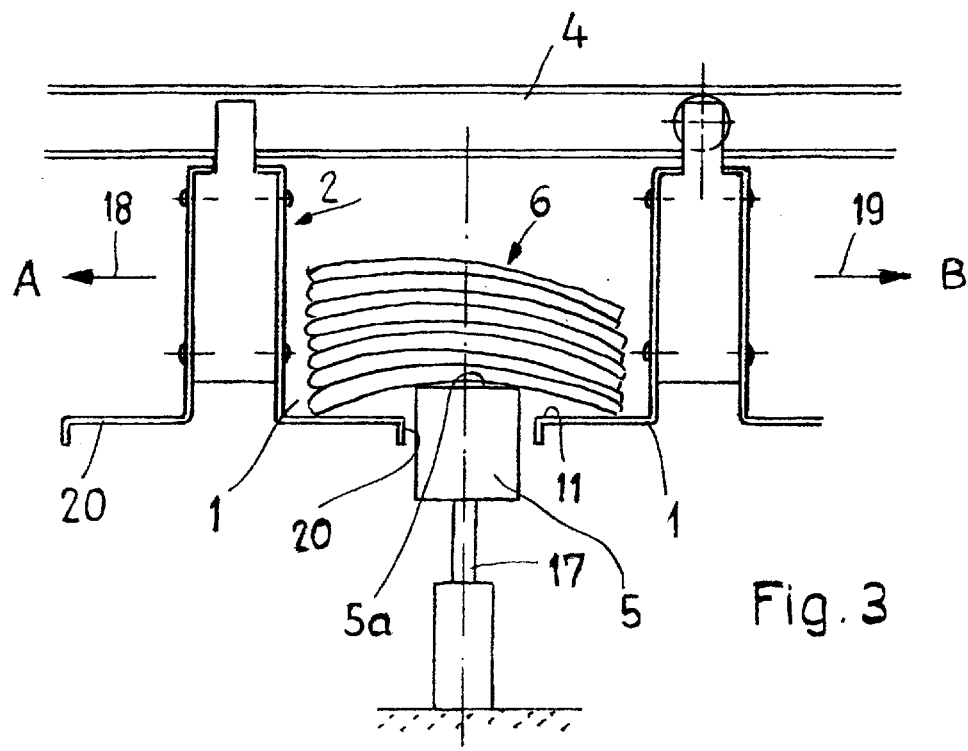
FIG. 3 shows a schematic view of the second transport path.
Figure 4:
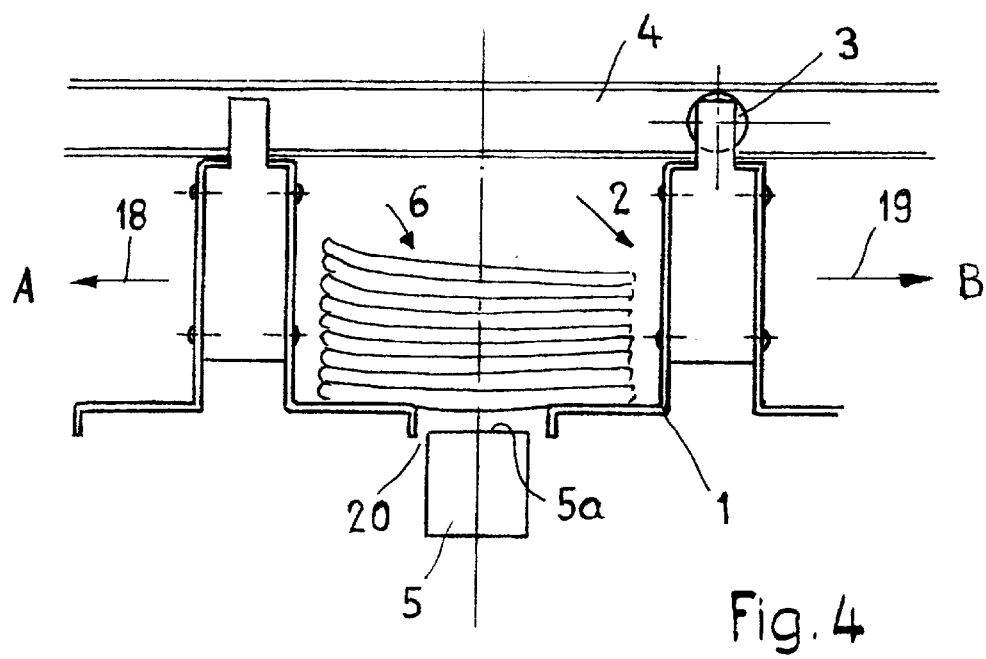
FIG. 4 shows the transport path according to FIG. 3 with packages being stored therein.

Above the conveying device 5 parallel rails 4 support box-shaped storage units 2 which are movable by drive units (not shown) in the direction of arrows 18 and 19 in a direction transverse to the conveying direction of the conveying device 5. The supporting action is, for example, provided by running wheels 3 which are located laterally on the box-shaped storage units 2. Each storage unit 2 has preferably several straight, elongate, strip-shaped storage surfaces 11 which are each arranged in a channel-shaped area 1. As illustrated in FIGS. 3 and 4, a passage 20 is provided approximately centrally in the support surface 11 and extends over the entire length of the area 1. The storage units 2 illustrated in FIG. 1 each have three such areas 1. However, fewer or more than three areas 1 can be provided.

The conveying device 5 can be height-adjusted by a lifting device 17 (FIG. 3). In the position shown in FIG. 3 the conveying device 5 penetrates through the passage 20 into the storage unit 2 while in the lower position according to FIG. 4 the conveying device 5 is positioned below the storage unit 2. In the position according to FIG. 3 the carrying run 5a of the conveying device 5 is positioned above the passage 20 and in the position according to FIG. 4 the carrying run 5a is below the passage 20. When the conveying device 5 is in the lower position according to FIG. 4, the storage unit 2 can be moved to the left or to the right in the direction of arrows 18 and 19 transverse to the conveying direction. In the position according to FIG. 3 the storage unit 2, on the other hand, stands still.

In the following the operation of the arrangement according to the invention will be explained.

When an intermediate storage is not required, the packages 6 are transported by the transport belt 7 directly from the loading station 12 to the transfer station 13. When an intermediate storage is, however, required, the packages 6 are guided such that they are moved onto the inclined belt 9. Suitable guiding devices for this purpose are known to a person skilled in the art. The conveying device 5 is then positioned by means of the lifting device 17 in the upper position illustrated in FIG. 3. The belt 9 transports the packages 6 to an entry location 14 of a channel-shaped area 1 and onto the conveying device 5. The package 6 and the subsequently following packages are then transported above the storage surface 11 toward the exit 15. The conveying device 5 is controlled preferably such that the arriving packages 6 are arranged in a gap-free formation by sequentiality performed transport and waiting steps. When the leading package 6a (FIG. 1) has reached the exit 15, the conveying device 5 is lowered by means of the device 17 into the position illustrated in FIG. 4. The packages 6 positioned between the entry location 14 and the exit 15 are thus placed onto the storage surface 11. The storage unit 2 is now moved either to the left in the direction of arrow 18 (FIG. 3) or to the right in the direction of arrow 19 (FIG. 3) until the conveying device 5 is positioned below a further passage 20. The conveying device 5 is now ready for loading a further channel-shaped area 1. Once this further area 1 has been loaded, the process is repeated until the required number of packages 6 is placed into intermediate storage.

Figure 5:
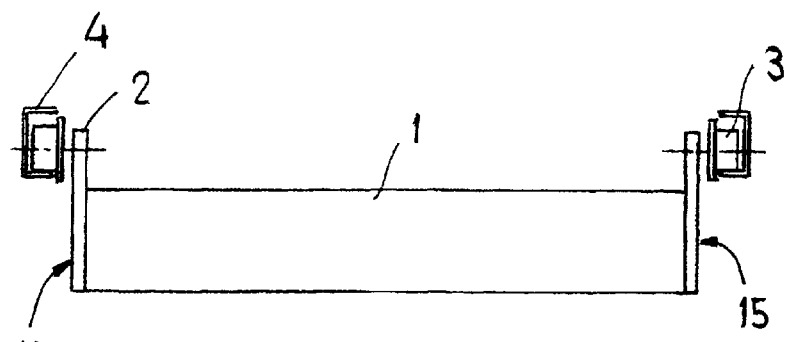
FIG. 5 shows schematically a view of a portion of the arrangement.
Figure 6:
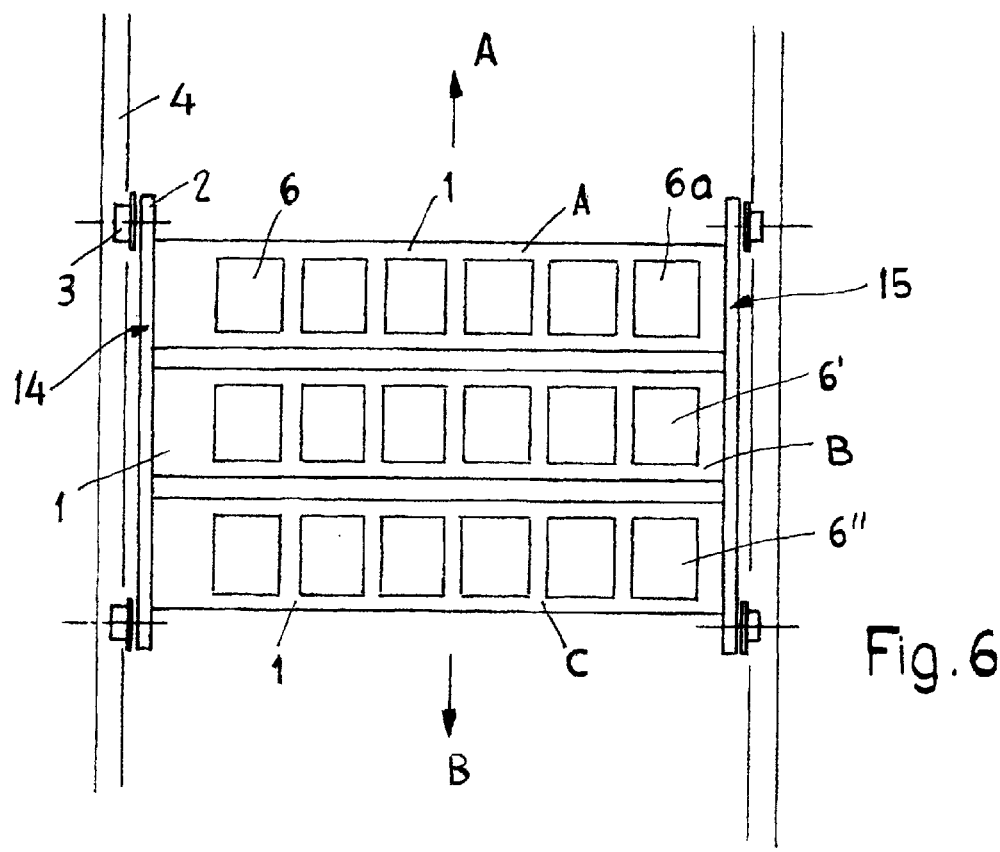
FIG. 6 is a plan view onto the portion according to FIG. 5.

FIGS. 5 and 6 show a storage unit 2 with packages 6, 6', and 6" which each form a row-shaped formation A, B, C. The formations A, B, C form rows which are preferably arranged in accordance with the vehicle loading or routing requirements. For example, the formations A, B, C are assigned to different sales areas, for example, different cities. The number of packages 6, 6', 6" can differ. However, it is desirable that the areas 1 are filled with packages completely and as gap-free as possible. The storage units 2 are preferably moved horizontally to the left and to the right relative to the transport direction. However, conceivable is also a transport in the vertical direction. Conceivable is moreover that the storage units 2 are stationary and the conveying device 5 can be moved from one area 1 to another area 1. Moreover, the storage units 2 can also be serviced by several conveying devices 5. In principle, the conveying device 5 can also be a portion of the transport belt 7.

For unloading and transferring the intermediately stored packages 6, 6', 6", a channel-shaped area 1 is positioned above the conveying device 5 such that the conveying device 5 can be lifted into the position illustrated in FIG. 3. The packages 6 to be unloaded and transferred are thus engaged by the conveying device 5 and transported by the conveying device 5 to the exit 15 and onto the belt 10. The belt 10 is pivoted into the downwardly slanted position, and the packages 6 are thus transported from the exit 15 onto one of the loading belts 8. The loading belt 8 conveys the packages 6 to the vehicle 17. Once a channel-shaped area 1 is empty, the conveying device 5 is lowered and the unit 2 is moved transversely to the transport direction of the conveying device 5 for unloading a further area 1. Unloading of this further area 1 is carried out as described above. Once all storage units 2 have been emptied, the arrangement is then ready to again provide direct transport of the packages on the transport belt 7 or to provide intermediate storage of the packages by means of the conveying device 5.

While specific embodiments of the invention have been shown and described in detail to illustrate the inventive principles, it will be understood that the invention may be embodied otherwise without departing from such principles.

What is claimed is:

1. An arrangement for intermediate storage of packages, the arrangement comprising:

a first transport path and a loading station, wherein the first transport path is configured to transport packages from a loading station to a transfer station;

a second transport path and at least one storage surface arranged along the second transport path, wherein the second transport path is configured to receive packages from the first transport path and place the packages in the transport direction onto the at least one storage surface for intermediate storage of the packages and unload the packages in the transport direction from the at least one storage surface and transport the packages to the transfer station, wherein the second transport path is configured to place the packages in row formations onto the at least one storage surface, wherein the second transport path has a conveying device configured to convey the packages to and from the at least one storage surface, wherein the at least one storage surface is moveable transversely in a single plane to the transport direction.

2. The arrangement according to claim 1, wherein the second transport path is configured to place the packages in a substantially gap-free formation onto the at least one storage surface.

3. The arrangement according to claim 1, wherein several storage surfaces are arranged substantially parallel to one another.

4. The arrangement according to claim 1, wherein the conveying device is configured to convey the packages in a densified formation.

5. The arrangement according to claim 1, wherein several storage surfaces are combined to a storage unit.

6. The arrangement according to claim 1, wherein the first transport path has two parallel sections and wherein the second transport path extends between the two parallel sections.

7. The arrangement according to claim 1, wherein at least one of the storage surfaces has a passage configured to allow the conveying device to pass through.

8. The arrangement according to claim 7, wherein the conveying device comprises a lifting device configured to vertically move the conveying device.

9. The arrangement according to claim 1, wherein the conveying device is stationary and height-adjustable.

10. The arrangement according to claim 9, wherein the conveying device has a horizontally extending carrying run.

11. The arrangement according to claim 1, wherein the loading station comprises at least one stacker configured to receive printed matter from a gravure printing machine, a rotary offset machine, or a newspaper rotary printing press.

12. The arrangement according to claim 1, configured to switch between a direct transport of the packages via the first transport path onto transport vehicles and an intermediate storage of the packages via the second transport path.

13. The arrangement according to claim 12, configured to store the packages on the at least one storage surface in a recallable formation selected according to routing.

* * * * *